United States Patent [19]
Nilssen

[11] Patent Number: 5,510,694
[45] Date of Patent: Apr. 23, 1996

[54] STORAGE BATTERY WITH BUILT-IN CHARGER AND CONTROLS

[76] Inventor: Ole K. Nilssen, Caesar Dr., Barrington, Ill. 60010

[21] Appl. No.: 811,922

[22] Filed: Dec. 23, 1991

Related U.S. Application Data

[63] Continuation of Ser. No. 802,237, Nov. 27, 1985, abandoned.

[51] Int. Cl.$^6$ ........................................ H02J 7/10
[52] U.S. Cl. .............................. 320/39; 320/48
[58] Field of Search .................. 320/2, 39, 40, 320/48

[56] References Cited

U.S. PATENT DOCUMENTS

| | | | |
|---|---|---|---|
| 3,963,972 | 6/1976 | Todd | 320/2 |
| 4,061,956 | 12/1977 | Brown et al. | 320/39 |
| 4,161,682 | 7/1979 | Corvette | 320/2 |
| 4,386,308 | 5/1983 | Emile, Jr. et al. | 320/48 |
| 4,540,929 | 9/1985 | Binkley | 320/2 |

FOREIGN PATENT DOCUMENTS 0075580  4/1984  Japan .................. 320/DIG. 1

*Primary Examiner*—Emanuel T. Voeltz

[57] ABSTRACT

A special storage battery has a pair of output terminals and a separate pair of input terminals. Comprised within the special battery is a sealed maintenance-free automotive-type storage battery with a pair of battery electrodes. A compact inverter-type battery charger is connected between the input terminals and the battery electrodes, and a control arrangement is connected between the battery electrodes and the output terminals.

The input terminals are provided in the form of a recessed male receptacle adapted to connect with: i) a 120 Volt/60 Hz power line by way of a power cord having a female plug means at its one end and an ordinary power plug at its other end, or ii) a 12 Volt/DC source by way of a power cord having a female plug means at its one end and exposed conductors at its other end.

The battery charger is operative to provide battery charging in an automatic manner from either 120 Volt/60 Hz or 12 Volt/DC.

The control arrangement comprises: i) electrically actuatable contactor means operable on command to make connection between the battery electrodes and the output terminals, ii) voltage sensing means operative to prevent the contactor means from being or remaining actuated in case the voltage present across the output terminals falls outside a predetermined band of values, and iii) over-current protection means operative to prevent current from/to the output terminals from exceeding a predetermined magnitude for longer than a brief period.

30 Claims, 3 Drawing Sheets

| Fig. 3a | Fig. 3b |

STORAGE BATTERY WITH BUILT-IN CHARGER AND CONTROLS

This application is a continuation of application Ser. No. 06/802,237, filed Nov. 27, 1985, now abandoned.

FIELD OF INVENTION

The present invention relates to electric storage batteries, particularly of a type useful in automotive vehicles and similar applications and having built-in charging and control means.

PRIOR ART

Presently, when facing a situation of having a discharged battery in a car, the typical solution is that of making a jump-connection with another car's battery, thereby to permit getting the engine started.

Often, however, another car is not readily accessible. Moreover, many persons find it too difficult and/or too unnerving to make the requisite battery-to-battery jump-connection; which, in fact, does represent a potentially hazardous proposition.

No safe and easy-to-use means are presently available for solving the problem associated with having a discharged battery in a car.

SUMMARY OF THE INVENTION

Objects of the Invention

A first object of the present invention is that of providing a special storage battery that is useful for safe jump-connection with another storage battery, such as a discharged battery in an automotive vehicle.

A second object is that of providing a spare battery that is safe and convenient to carry along in the trunk of a car, as well as easy and safe to use for jump-connection with a car's main battery.

A third object is that of providing a storage battery comprising its own built-in charging means.

A fourth object is that of providing a storage battery that can readily be recharged by way of direct connection with an ordinary 120 Volt/60 Hz power line or with a 12 Volt/DC source.

A fifth object is that of providing a special storage battery useful for charging another storage battery.

A sixth object is that of providing a storage battery having built-in means for controlling and/or limiting the amount of current that can flow from or to its output terminals.

A seventh object is that of providing a storage battery having a pair of output terminals as well as a pair of separate charging terminals.

These, as well as other objects, features and advantages of the present invention will become aparent from the following description and claims.

BRIEF DESCRIPTION

In its preferred embodiment, the present invention constitutes a special storage battery having a pair of power output terminals and a separate pair of power input or charging terminals. Comprised within the special battery is a sealed maintenance-free automotive-type storage battery with a pair of battery electrodes. A compact inverter-type battery charger is connected between the charging terminals and the battery electrodes, and a control arrangement is connected between the battery electrodes and the power output terminals.

The charging terminals are provided in the form of a recessed male receptacle adapted to connect: i) with a 120 Volt/60 Hz power line by way of a power cord having a female plug means at its one end and an ordinary 120 Volt/60 Hz power plug at its other end, or ii) with a 12 Volt/DC source by way of a power cord having a female plug means at its one end and a special 12 Volt/DC plug or exposed conductors at its other end, the special 12 Volt/DC plug (or the exposed conductors) being suitable for connection with an automobile's 12 Volt electrical system.

The battery charger is operative to provide fully automatic charging of the sealed maintenance-free automotive-type battery from either 120 Volt/60 Hz or 12 Volt/DC.

The control arrangement comprises: i) electrically actuatable contactor means operable on command to make connection between the battery electrodes and the power output terminals, ii) voltage sensing means operative to prevent the contactor means from being or remaining actuated in case the voltage present across the power output terminals falls outside a predetermined band of values, and iii) over-current protection means operative to prevent current from/to the power output terminals from exceeding a predetermined magnitude for longer than a brief period.

A built-in means provides an audible alarm in case the battery's charge level falls below a predetermined value.

The special storage battery can safely and conveniently be connected with another battery and/or with the electrical system of an automobile, thereby being useful for charging this other battery and/or for cranking and starting the engine in the automobile.

Preferably, the nominal voltage on the sealed maintenance-free automotive-type storage battery is 14 Volt or 16 Volt, thereby making the special storage battery particularly effective for charging an ordinary 12 Volt storage battery.

In its preferred embodiment, the special storage battery is completely sealed and has a carrying handle and/or small wheels with a pull-strap. The battery's only accessible electrical connections are the power output terminals and the power input or charging terminals.

A set of control or programming knobs and buttons, as well as display means for reading voltage and/or current, are also provided.

In another preferred embodiment, the battery charger and the control arrangement are provided in the form of a structure that is separable from the sealed maintenance-free automotive-type storage battery, thereby providing the option of re-using the battery charger and the control arrangement with another storage battery.

DESCRIPTION OF THE PREFERRED EMBODIMENT

Details of Construction

Figures 1, 1A:
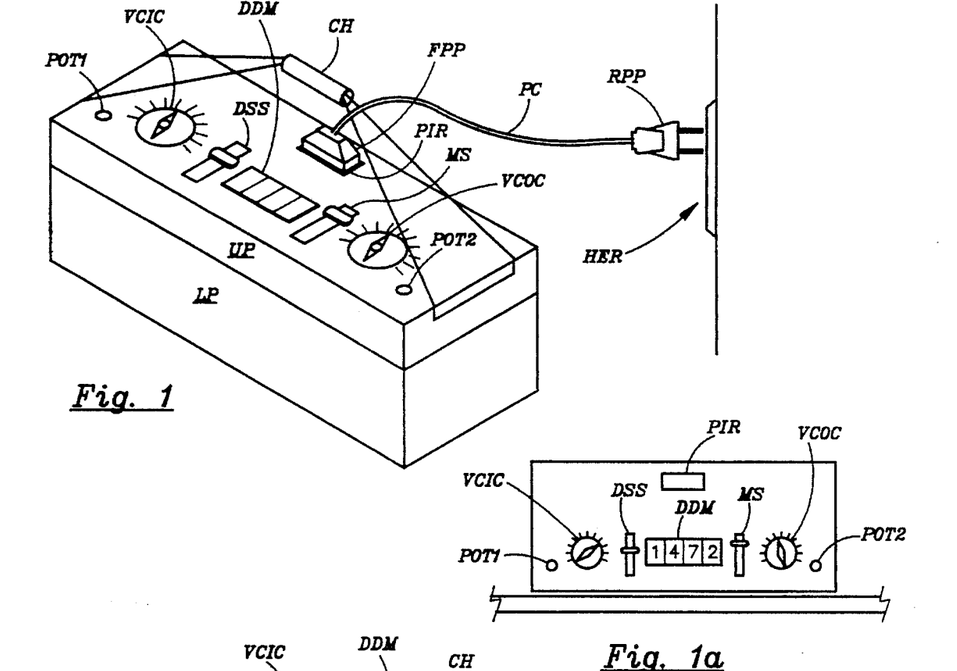
FIG. 1 provides a perspective overall view of the preferred embodiment of the special storage battery.

FIG. 1 shows an overall perspective view of the special storage battery SSB.

The special storage battery has a carrying handle CH, a positive power output terminal POT1 and a negative power output terminal POT2. It also has a power input receptacle PIR into which is plugged a female power plug FPP connected with one end of a power cord PC. The other end of the power cord is connected with a regular power plug RPP, which is inserted into an ordinary household electric receptacle HER.

A digital display means DDM is mounted on top of the special battery charger, as are also: i) a display selector switch DSS, ii) a voltage cut-in control VCIC, iii) a voltage cut-out control VCOC, and iv) a mode switch MS.

The special storage battery is divided into an upper portion UP and a lower portion LP. The upper portion comprises the charger and controls as well as all the electrical terminals and control/display means.

The special storage battery may be placed on a floor, or—as indicated in FIG. 1x—the carrying handle may be removed and the battery may be placed on a shelf.

Figure 2:
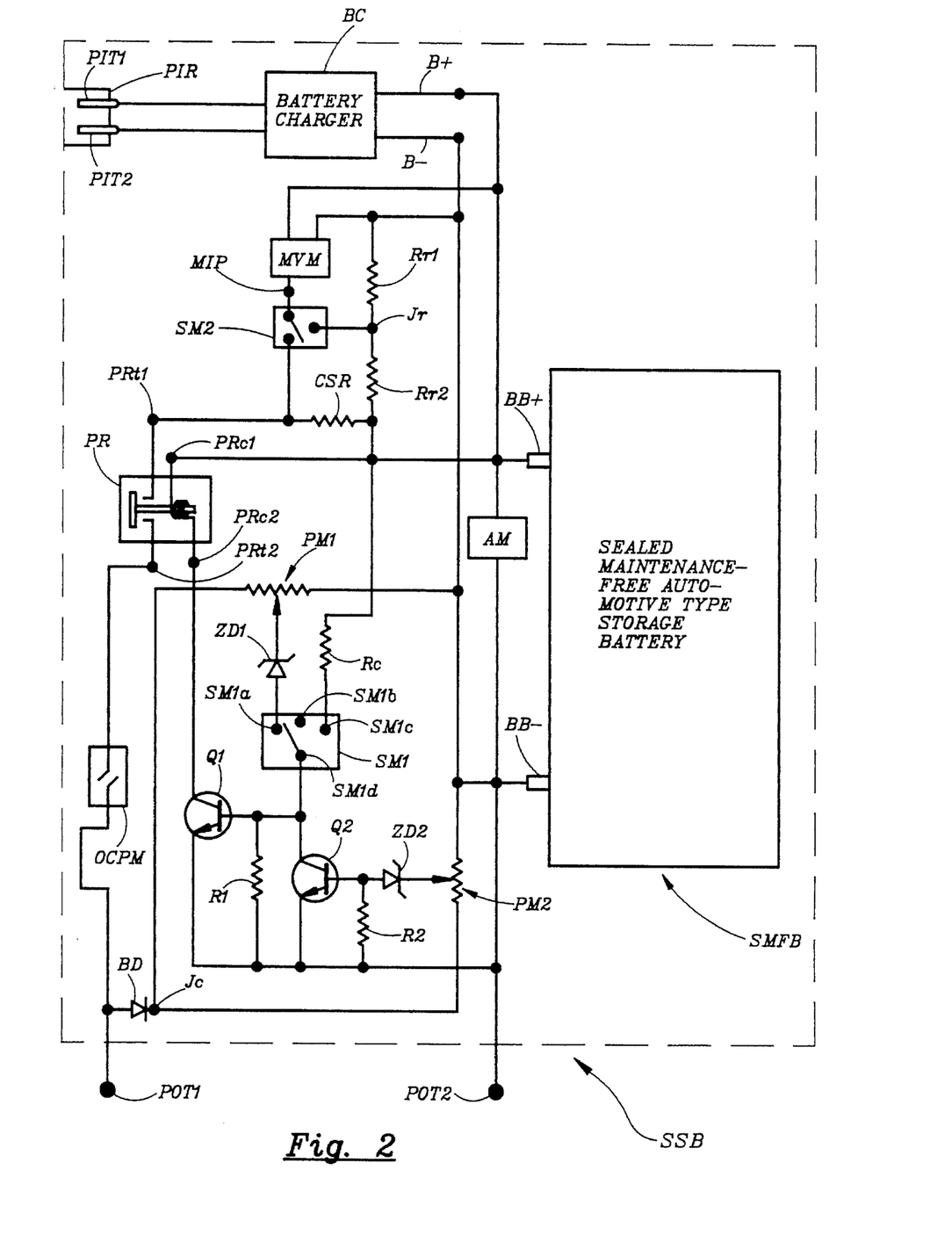
FIG. 2 represents a schematic electric circuit diagram of the preferred embodiment of the special storage battery.

FIG. 2 represents a schmematic electrical diagram of the components comprised within the special storage battery SSP.

In FIG. 2, a battery charger BC is connected with power input terminals PIT1 and PIT2 of power input receptacle PIR. The battery charger has a positive output terminal B+ connected with positive electrode BB+ of a sealed maintenance-free automotive-type storage battery SMFB and a negative output terminal B− connected with negative electrode BB− of the SMFB battery.

The BB− electrode is connected directly to the negative power output terminal POT2 of special storage battery SSB.

The BB+ electrode of the SMFB battery is connected with a first terminal PRt1 of a power relay PR1 by way of a current sensing resistor CSR. A second terminal PRt2 of power relay PR is connected by way of over-current protection means OCPM with positive power output terminal POT1 of special storage battery SSB.

Power relay PR has a first control terminal PRc1 connected with the BB+ electrode and a second control terminal PRc2 connected with the collector of a first transistor Q1. The emitter of transistor Q1 is connected with the BB− electrode. A resistor R1 is connected across the base-emitter junction of transistor Q1.

A second transistor Q2 is connected with its collector to the base of transistor Q1 and with its emitter to the BB− electrode. A resistor R2 is connected across the base-emitter junction of transistor Q2.

A blocking diode BD is connected with its anode to the POT1 terminal and with its cathode to a junction Jc. A potentiometer PM1 is connected between junction Jc and the BB− electrode, with its wiper arm connected with the cathode of a Zener diode ZD1. The anode of Zener diode ZD1 is connected with a first terminal SM1a of a first switch means SM1. A second terminal SM1b of switch means SM1 is left unconnected; and a third terminal SM1c is connected through a resistor Rc to the BB+ electrode.

A fourth terminal SM1d of switch means SM1 is connected with the base of transistor Q1.

A second switch means SM2 has three terminals and is connected with the first of these three terminals to the PRt1 terminal, with its second terminal to a junction Jr, and with its third terminal to an input terminal MIP of a milli-Volt meter MVM; which is otherwise connected between the B+ and the B− terminals of battery charger BC. A resistor Rr1 is connected between the B− terminal and junction Jr; and a resistor Rr2 is connected between junction Jr and the B+ terminal.

Another potentiometer PM2 is connected between junction Jc and the BB− electrode, with its wiper arm being connected with the cathode of a Zener diode ZD2. The anode of Zener diode ZD2 is connected with the base of transistor Q2.

With reference to FIG. 1, switch means SM1 and SM2 correspond to mode switch MS and display selector switch DSS, respectively; and potentiometers PM1 and PM2 correspond to voltage cut-in control VCIC and voltage cut-out control VCOC, respectively.

An alarm means AM is connected directly between the BB+ and the BB− electrodes.

Figures 3, 3B:
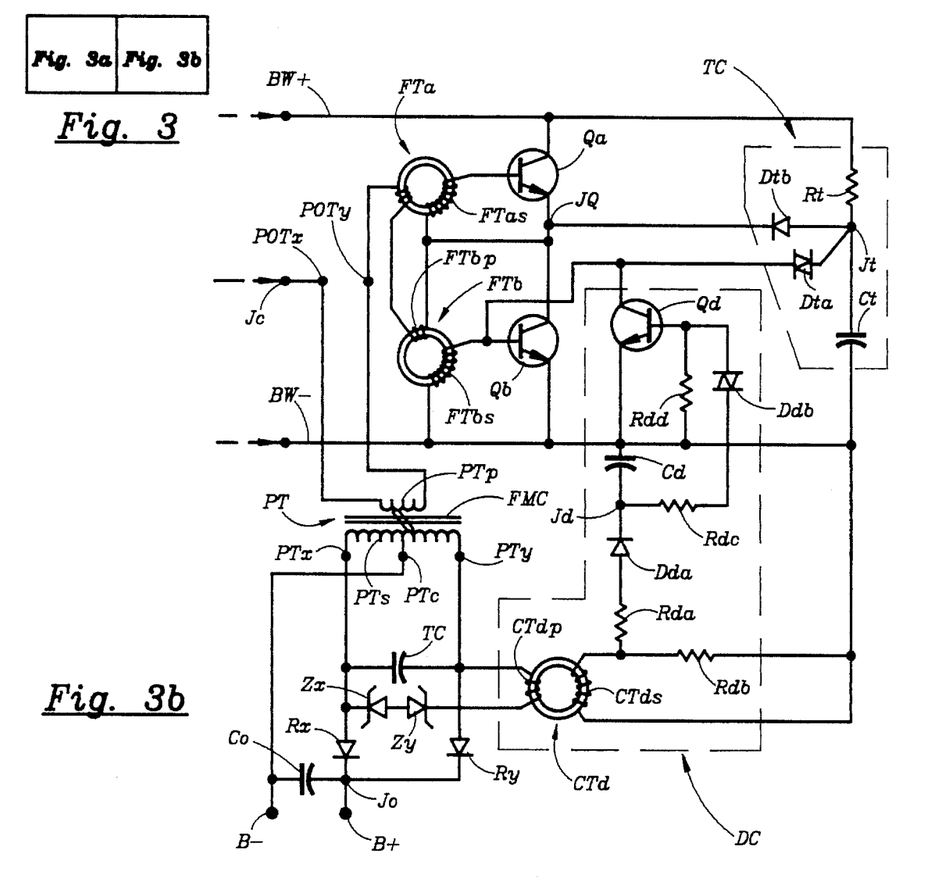
FIG. 3 represents a detailed schematic circuit diagram of the dual-voltage battery charger built into in the special storage battery.
Figure 3A:
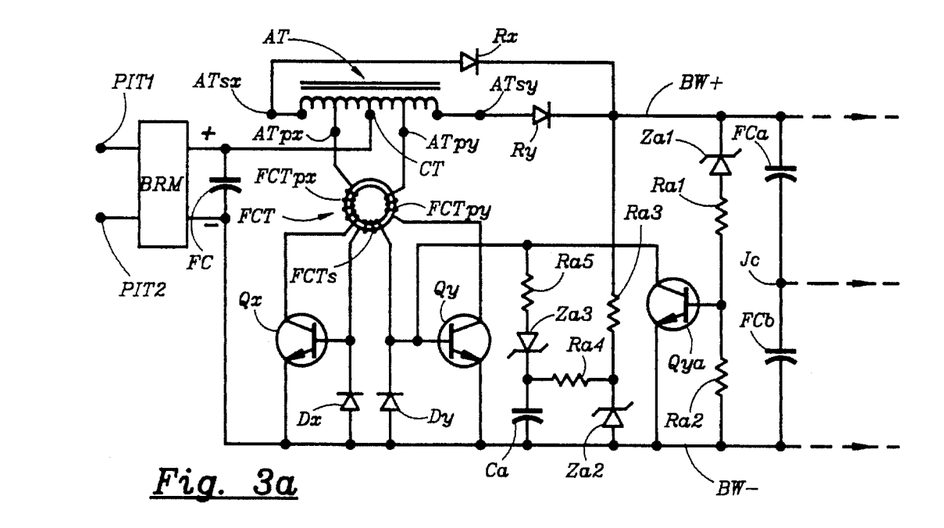

FIG. 3 represents a circuit diagram of dual-voltage battery charger BC. For clarity, this circuit diagram is divided into two parts: FIG. 3a and FIG. 3b.

In FIG. 3a, power input terminals PIT1 and PIT2 are connected with a bridge rectifier means BRM, the DC output of which is applied across a filter capacitor FC. The positive terminal (+) of the bridge rectifier means is connected with a center-tap CT of an auto-transformer AT; and the negative terminal (−) of the bridge rectifier means is connected with bus wire BW−.

Auto-transformer AT has two primary terminals ATpx and ATpy, and two secondary terminals ATsx and ATsy.

Terminal ATpx is connected with the collector of a first transistor Qx by way of a first primary winding FCTpx of a feedback current transformer FCT; and terminal ATpy is connected with the collector of a second transistor Qy by way of a second primary winding FCTpy of transformer FCT.

Transformer FCT has a secondary winding FCTs connected between the bases of transistors Qx and Qy.

The emitters of transistors Qx and Qy are both connected with bus wire BW−. A first and a second diode Dx and Dy are connected across the base-emitter junctions of transistors Qx and Qy, respectively, in such manner that their anodes are both connected with bus wire BW−.

Terminals ATsx and ATsy of auto-transformer AT are connected with the anodes of rectifiers Rx and Ry, respectively. The cathodes of rectifiers Rx and Ry are both connected with a positive bus wire BW+.

A first filter capacitor FCa is connected between positive bus wire BW+ and a junction Jc; and a second filter capacitor FCb is connected between junction Jc and negative bus wire BW−.

A Zener diode Za1 is connected with its cathode to bus wire BW+ and, by way of a resistor Ra1, to the base of an auxiliary transistor Qya. A resistor Ra2 is connected between the base and the emitter of transistor Qya; which emitter is connected with bus wire BW−. The collector of transistor Qya is connected with the base of transistor Qy.

A resistor Ra3 is connected between bus wire BW+ and the cathode of another Zener diode Za2. The anode of Zener diode Za2 is connected with bus wire BW−. A resistor Ra4 is connected between the cathode of Zener diode Za2 and the cathode of yet another Zener diode Za3. A capacitor Ca is connected between the cathode of Zener diode Za3 and bus wire BW−; and a resistor Ra5 is connected between the anode of Zener diode Za3 and the base of transistor Qy.

Bus wires BW+ and BW−, as well as junction Jc, constitute the three-terminal output of the first part of the complete battery charger circuit, which first part is illustrated by FIG. 3a. The three-terminal output from this first part constitutes the input to the second part of the complete battery charger circuit, which second part is illustrated by FIG. 3b.

In FIG. 3b, a first transistor Qa is connected with its collector to bus wire BW+ and with its emitter to a junction JQ. A second transistor Qb is connected with its collector to junction JQ and with its emitter to bus wire BW−.

A first saturable current feedback transformer FTa has a primary winding FTap and a secondary winding FTas, which secondary winding is connected across the base-emitter junction of transistor Qa. A second saturable current feedback transformer FTb has a primary winding FTbp and a secondary winding FTbs, which secondary winding is connected across the base-emitter junction of transistor Qb.

A first inverter power output terminal POTx is connected directly with junction Jc. A second inverter power output terminal POTy is connected with junction JQ by way of series-connected primary windings FTap and FTbp.

A trigger resistor Rt is connected between bus wire BW+ and a trigger junction Jt; a trigger capacitor Ct is connected between junction Jt and bus wire BW−; a trigger Diac Dta is connected between junction Jt and the base of transistor Qb; and a trigger diode Dtb is connected with its anode to junction Jt and with its cathode to junction JQ.

The circuit comprising elements Rt, Ct, Dta and Dtb is referred to as trigger circuit TC.

A power transformer PT has a primary winding PTp connected across inverter power output terminals POTx and POTy, and a secondary winding PTs having a center-tap PTc and terminals PTx and PTy. This transformer has a ferrite magnetic core FMC; which core is so constituted as to provide for a degree of magnetic flux shunting between the primary winding and the secondary winding.

Center-tap PTc is connected directly with a first battery charger output terminal B−. A tank capacitor TC is connected across transformer terminals PTx and PTy.

A first Zener diode Zx is connected with its cathode to terminal PTx and with its anode to the anode of a second Zener diode Zy. The cathode of Zy is connected with terminal PTy by way of a primary winding CTdp of a current transformer CTd.

One of the two terminals of a secondary winding CTds of current transformer CTd is directly connected with bus wire BW−. The other of these two terminals is connected with the anode of a disable diode Dda by way of a resistor Rda. A resistor Rdb is connected directly across secondary winding CTds.

The cathode of disable diode Dda is connected to a disable junction Jd. A disable capacitor Cd is connected between junction Jd and bus wire BW−. A series-connection of a disable resistor Rdc and a disable Diac Ddb is connected between junction Jd and the base of a disable transistor Qd. The collector of this disable transistor is connected with the base of transistor Qb; and its emitter is connected with bus wire BW−. A resistor Rdd is connected between the base and the emitter of transistor Qd.

The circuit comprising elements CTd, Rda, Rdb, Rdc, Rdd, Dda, Ddb, Dc, and Qd is referred to as disable circuit DC.

Terminal PTx is connected with the anode of a first high-frequency power rectifier Rx, and terminal PTy is connected with the anode of a second high-frequency power rectifier Ry. The cathodes of rectifiers Rx and Ry are connected together at DC output junction Jo, which is connected directly with positive charger output terminal B+. An energy storage capacitor Co is connected between junction Jo and the charger's B− terminal.

With reference to FIG. 2, the B+ and B− terminals of the battery charger of FIG. 3 are respectively connected with the BB+ and the BB− electrodes of the sealed maintenance-free automotive-type storage battery SMFB comprised within the special storage battery SSB.

Figure 4:
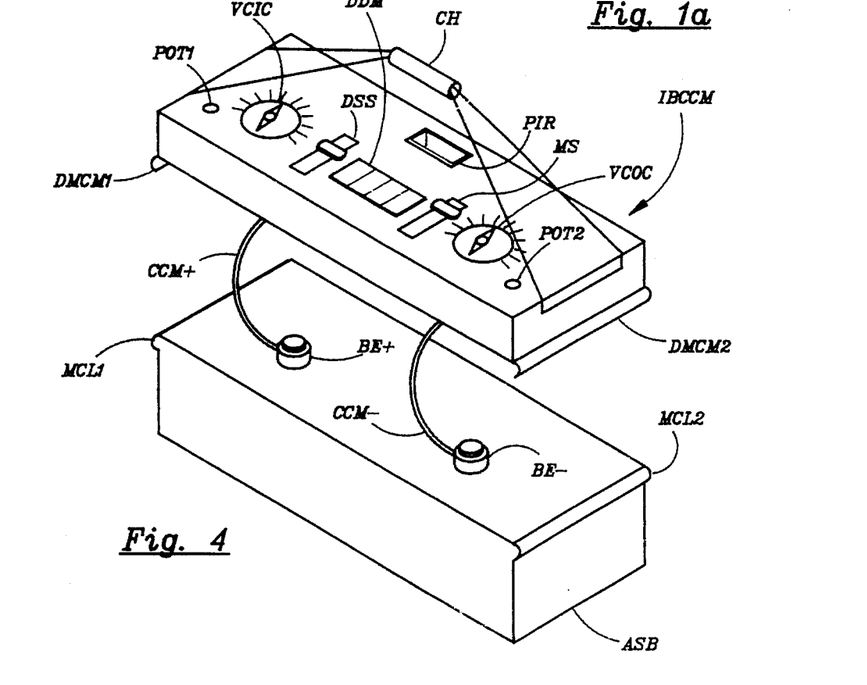
FIG. 4 illustrates the combination of the battery charger and the control arrangement as an integral entity detachable from the sealed maintenance-free automotive-type storage battery.

FIG. 4 provides a perspective view of an arrangement whereby the battery charger and control arrangement of FIG. 2 are provided in the form of an integral entity separate of the SMFB battery.

More particularly, in FIG. 4, an integral battery charging and control means IBCCM comprises the elements of the upper part UP of FIG. 1, including carrying handle CH, power input receptacle PIR, power output terminals POT1 and POT2, digital display means DDM, display selector switch DSS, mode switch MS, voltage cut-in control VCIC, and voltage cut-out control VCOC.

Also, integral battery charger and control means IBCCM has a positive connection cable and clamp means CCM+, and a negative connection cable and clamp means CCM−; which two cable and clamp means are respectively and disconnectably connectable with positive battery electrodes BE+ and negative battery electrode BE− of an automotive-type storage battery ASB.

Moreover, the integral battery charger and control means has a pair of disconnectable mechanical connect means DMCM1 and DMCM2 adapted to make firm and aligned disconnectable mechanical connection with automotive-type storage battery ASB by way of corresponding mechanical connect lips MCL1 and MCL2.

Thus, by way of connect means DMCM1/DMCM2 and MCL1/MCL2, integral battery charger and control means IBCCM can be firmly and safely connected with (as well as disconnected from) an automotive storage battery ASB—with the two entities IBCCM and ASB, when connected, appearing substantially like special storage battery SSB of FIG. 1.

In other words, entity IBCCM may be considered as a combination battery charger, battery output control, and battery carrying means.

Details of Operation

The operation of special storage battery SSB of FIG. 1 may be explained as follows.

Whenever practicable, special storage battery SSB should be connected with a 120 Volt/60 Hz power line, or—by way of a different connect cord (not shown)—with a 12 Volt/DC source. That way, the built-in sealed maintenance-free battery SMFB will always be kept up to full charge and will suffer a minimum of deterioration with time.

Special storage battery SSB may be used in several different ways, such as: i) as a source of well-filtered DC voltage; ii) as a source of portable DC power; iii) as a battery charging means for accomplishing complete charging of another (preferably 12 Volt ) storage battery; iv ) as a means for providing a high-rate quick-charge or boost-charge to another storage battery; and v) as a battery suitable for making a jump-connection with a discharged battery in an automotive vehicle, thereby permitting the engine in that vehicle to be cranked and started by power supplied from the SSB.

When connecting special storage battery SSB with another storage battery having a positive and a negative electrode, it is important that terminal POT1 be connected with the positive electrode and that terminal POT2 be connected with the negative electrode.

While providing power output, special storage battery SSB may or may not be connected with a 120 Volt/60 Hz or a 12 Volt/DC source of input power; although while being so connected it is clearly possible to provide a higher degree of power output than when not being so connected.

As will be more fully explained in connection with FIG. 2, mode switch MS, voltage cut-in control VCIC, and voltage cut-out control VCOC should be properly adjusted for the particular use to which special storage battery SSB is put.

The detailed operation of the special storage battery is best explained with reference to FIG. 2.

In FIG. 2, as long as either a 120 Volt/60 Hz voltage or a 12 Volt/DC voltage is connected with power input terminals PIT1/PIT2, battery charger BC is operative to charge the sealed maintenance-free battery SMFB comprised within special storage battery SSB. However, battery charger BC is a fully automatic battery charger and is so constituted as to permit battery SMFB to be float-charged; which implies that substantially no power is being absorbed from the power input terminals after the SMFB battery has reached full charge.

Output from the built-in SMFB battery is provided to the power output terminals (POT1 and POT2) of the special storage battery (SSB) by way of normally open power relay PR and over-current protection means OCPM. Thus, current can only flow from these power output terminals when that relay is actuated, which is to say when control transistor Q1 is actuated.

The actuation of transistor Q1 is controlled by way of switch means SM1; which, in turn, is actuated by the mode switch MS indicated on FIG. 1.

With switch means SM1 in the position indicated in FIG. 2 (i.e., with SM1d connected with SM1a), transistor Q1 gets actuated as long as there is a positive voltage present on the POT1 terminal (relative to the POT2 terminal), and as long as the magnitude of that voltage is high enough to cause current to flow through Zener diode ZD1 for the particular setting of the PM1 potentiometer (i.e., the particular setting of voltage cut-in control VCIC of FIG. 1). Thus, if the terminals of a battery-to-be-charged were connected with the POT1/POT2 terminals, it would be necessary that there be enough voltage remaining on that battery-to-be-charged to cause actuation of transistor Q1. Otherwise, power relay PR would not close and no charging could take place.

With a battery-to-be-charged properly connected with and being charged by the POT1/POT2 terminals, charging will take place until the magnitude of the voltage across the POT1/POT2 terminals reaches a level so high as to cause enough current to flow into the base of transistor Q2 to cause de-actuation of transistor Q1. At that point, charging ceases and will not be re-started until the magnitude of the voltage across the POT1/POT2 terminals falls to a level low enough to de-actuate transistor Q2, thereby to re-actuate transistor Q1.

The particular voltage magnitude at which charging current ceases to flow is adjusted by the voltage cut-out control (VCOC of FIG. 1), which is to say by the setting of potentiometer PM2.

If a battery-to-be-charged were to be connected with the POT1/POT2 terminals with incorrect (or reverse) polarity, transistor Q1 would not get actuated, and power relay PR would remain open. Thus, there is protection against a reversely connected battery-to-be-charged.

When special storage battery SSB is not being used for providing power output, switch means SM1 should be placed in a position whereby terminal SM1d is connected with terminal SM1b; in which case the built-in SMFB battery remains disconnected from the POT1/POT2 terminals regardless of any load thereto connected.

When connected with an exceptionally deeply discharged battery, or with a substantially resistive load, or with an electric motor, etc., mode switch MS should be so positioned as to cause connection between terminals SM1d and SM1c of switch means SM1; in which case transistor Q1 will get actuated even in the absence of any voltage between the POT1/POT2 terminals; and will remain actuated until the magnitude of the voltage present between the BB−/BB+ electrodes decreases below a certain magnitude principally determined by the value or Rc.

To protect against excessive current draw, protection is provided in the form of over-current protection means OCPM; which means prevents a current of excessively large magnitude from flowing from power output terminals POT1/POT2 for an excessively long period of time.

Depending upon the setting of the display selector switch (DSS of FIG. 1), which is equivalent to the setting of switch means SM2, milli-Volt meter MVM is operative to permit monitoring of either the magnitude of the voltage present between the BB−/BB+ electrodes or the magnitude of the current flowing between power output terminals POT1/POT2.

In this connection it is noted that: i) the amount of current shunted away through the BD diode is so small as to be negligible relative to the current flowing between the POT1/POT2 terminals; ii) the resistance value of current sensing resistor CSR is so small as to cause less than about 100 milli-Volt to develop thereacross; and iii) resistors Rr1 and Rr2 constitute a voltage divider where the magnitude of the voltage developed across Rr2 is proportional to the magnitude of the voltage existing between the BB−/BB+ electrodes.

The operation of the over-current protection means OCPM, as well as that of milli-Volt meter MVM, is well known from prior art and need not be further explained here.

On the other hand, the operation of the dual-voltage battery charger BC does require further explanation.

The operation of battery charger BC—as schematically illustrated by FIG. 3—may be explained as follows.

With reference to FIG. 3a, the voltage provided between power input terminals PIT1/PIT2 may be either 120 Volt/60 Hz or 12 Volt/DC.

With 120 Volt/60 Hz applied to the PIT1/PIT2 terminals, a DC voltage of about 160 Volt magnitude will develop across filter capacitor FC. From the positive terminal of FC, current will flow essentially unimpeded through the windings of auto-transformer AT and rectifiers Rx/Ry to bus wire BW+. Thus, a DC voltage of about 160 Volt magnitude will also develop across the series-connected filter capacitors FCa/FCb, and will therefore be applied between bus wires BW− and BW+ of FIG. 3b.

With the magnitude of the voltage between bus wires BW−/BW+ being as high as 160 Volt, enough current flows through Zener diode Za1—which Zener diode has a Zener voltage of about 120 Volt—and into the base of transistor Qya to cause this transistor to enter a state whereby it constitutes an effective short circuit between its collector and emitter.

The short circuit between the collector and emitter of transistor Qya prevents the inverter circuit of FIG. 3a from oscillating—which inverter circuit is principally constituted by elements Qx, Dx, Qy, Dy, FCT, and AT. Thus, as long as the voltage between the BW–/BW+ bus wires exceeds about 120 Volt in magnitude, the inverter of FIG. 3a is a non-active part of the complete battery charger circuit.

On the other hand, with 12 Volt/DC applied to the PIT1/PIT2 terminals, the magnitude of the voltage developing between the BW–/BW+ bus wires will be less than 120 Volt; which means that no current will flow through Zener diode Za1, and that therefore transistor Qya will not become a short circuit. Thus, the inverter of FIG. 3a will oscillate at about 30 kHz, with the result that the voltage developing between the BW–/BW+ bus wires will be about 100 Volt— which magnitude is established by the transformation ratio of auto-transformer AT in combination with the magnitude of the DC voltage existing across filter capacitor FC (i.e., about 12 Volt ).

In other words, the approximately 12 Volt DC voltage across filter capacitor FC is inverted by the inverter of FIG. 3a to a high-frequency squarewave voltage, transformed in voltage-magnitude by auto-transformer AT, and rectified by rectifiers Rx/Ry, thereby to result in a DC voltage between the BW–/BW+ bus wires of about 100 Volt.

Of course, it is important that the magnitude of the DC voltage developing between the BW–/BW+ bus wires be kept below about 120 Volt; otherwise, the inverter would enter a periodically self-quenching mode of operation.

The purpose of the biasing network comprised of elements Ra3, Za2, Ra4, Ca, Za3, and Ra5 is that of establishing a delay of about 5 milli-seconds in the application of base biasing current for the inverter. That way, the inverter is prevented from being momentarily activated if by chance connection were made to the power line at a moment when the instantaneous magnitude of the voltage on the power line were below about 15 Volt.

Further details in respect to the operation of an inverter of the type illustrated in FIG. 3a can be found in U.S. Pat. No. 4,279,011 to Nilssen.

Thus, the overall purpose of the circuit arrangement of FIG. 3a is that of providing a suitable DC voltage between the BW–/BW+ bus wires whether the voltage applied to the PIT1/PIT2 terminals be 120 Volt/60 Hz or 12 Volt/DC. With 120 Volt/60 Hz, the resulting DC voltage between the BW–/BW+ bus wires will be about 160 Volt; with 12 Volt/DC, it will be about 100 Volt.

As shown subsequently herein, the inverter of FIG. 3b operates equally well whether the magnitude of the DC voltage between the BW–/BW+ bus wires is 160 Volt or 100 Volt—the only difference being in the magnitude of the resulting output current.

The two series-connected filter capacitors FCa and FCb are of approximately equal capacitance values; which implies that junction Jc will act as a center-tap for the DC voltage provided to the inverter of FIG. 3b.

In FIG. 3b, transistors Qa and Qb are arranged as a self-oscillating half-bridge inverter, the positive feedback being provided by saturable feedback transformers FTa and FTb.

The half-bridge inverter has to be triggered into oscillation; and the requisite triggering is provided by trigger circuit TC. In particular, after initially applying power to the inverter, whether it be in the form of 160 Volt or 100 Volt, capacitor Ct starts to charge; and when it reaches a voltage high enough to cause Diac Dta to reach its breakdown level (i.e., about 28 Volt), a trigger pulse is provided to the base of transistor Qb. After the inverter starts oscillation, capacitor Ct will be kept in a discharged state by way of diode Dta, thereby preventing unnecessary trigger pulses from being applied.

The inverter can be disabled by being triggered out of oscillation by way of disable circuit DC. In particular, if a trigger pulse of sufficient magnitude and duration is provided to the base of disable transistor Qd, a short circuit is in effect applied across the base-emitter junction of transistor Qb for a brief period. When that occurs, the inverter's positive feedback path is broken and inverter oscillation ceases. After having been disabled in this way, the inverter will not start oscillations again until being provided with a trigger pulse from trigger circuit TC.

The length of time required to charge capacitor Ct to the point of causing this trigger pulse to be provided can be adjusted by adjusting the resistance magnitude of Rt and/or the capacitance magnitude of Ct. In the preferred embodiment, this length of time is chosen to be about 30 seconds.

Otherwise, the half-bridge inverter, the trigger circuit, and the disable circuit operate in manners described in prior art, such as in U.S. Pat. Nos. 4,184,128 and 4,461,980 to Nilssen.

The inverter of FIG. 3b oscillates at a frequency of about 30 kHz, and therefore provides either an 80 Volt/30 kHz or a 50 Volt/30 kHz substantially squarewave output voltage across its power output terminals POTx/POTy.

The inverter's output voltage is provided to the primary winding of power transformer PT, whose secondary winding is relatively loosely coupled with its primary winding. This loose coupling is attained in manner well known, such as by providing for magnetic flux shunting between the primary and secondary windings. Thus, the transformer's secondary winding will have an internal impedance that is manifestly inductive, and will provide for a manifest limitation of the magnitude of the short circuit current available from the secondary winding.

The internal inductive reactance of the secondary winding is tuned with tank capacitor TC to series-resonate at the inverter's basic 30 kHz oscillation frequency. Thus, for the fundamental frequency of the 30 kHz squarewave, the capacitive reactance of capacitor TC cancels the inductive internal reactance of the transformer's secondary winding; which means that, in the absence of a load or other voltage-limiting means, the magnitude of the voltage resulting across capacitor TC would be equal to that of the open circuit voltage across the transformer's output terminals multiplied by the effective Q-factor of the resonating tank circuit.

However, wether or not there is a load connected across the B–/B+ terminals, there is always a voltage-limiting means present across the secondary of the power transformer. This voltage-limiting means is provided in the form of the two identical back-to-back Zener diodes (i.e., Zx and Zy), which operate to limit the peak magnitude of the voltage provided across output terminals PTx/PTy to that of the Zener voltage of these Zener diodes.

If the Zener diodes were to perform their voltage-limiting function for any significant length of time, they would have to have adequate power dissipation capabilities to absorb the full maximum power output of the inverter for that significant length of time. To avoid the need for such high power dissipation requirements, arrangements have been provided by which the current flowing through the Zener diodes is sensed and used for disabling the inverter by way of disabling circuit DC.

More particularly, the current flowing through the Zener diodes also flows through the primary winding of CTd, which then provides for a charging current to capacitor Cd. After the voltage on Cd has reached a magnitude large enough to cause Diac Ddb to break down, a current pulse is provided to the base of transistor Qd; which then provides a momentary short circuit across the base-emitter junction of transistor Qb, thereby disabling the inverter and thus stopping the flow of current through the Zener diodes.

The time required for the Zener current to cause disablement of the inverter depends of details of the disable circuit, such as the size and type of magnetic core in CTd, the number of turns on the windings of CTd, the values of resistors Rda and Rdb, and the value of capacitor Cd. In the preferred embodiment, and in the absense of any load connected with charger output terminals B−/B+, the disable-time was chosen to be about 25 milli-seconds; which means that the full output power of the inverter is only applied to the Zener diodes for about 25 milli-seconds before the inverter is disabled. After being disabled, it takes about 30 seconds for the inverter to be re-triggered into operation; which means that the average power dissipation that must be handled by the Zener diodes is only about 0.1% of the amount that they would have had to handle if the inverter had not been disabled.

When a discharged battery is connected with charger output terminals B−/B+, and if that battery is able to absorb all of the output current of the charger without causing the output voltage across the transformer output terminals to reach a magnitude so high as to give rise to flow of Zener current, charging current will be provided to the battery.

However, as the battery approaches full charge, the magnitude of the battery voltage increases and will eventually become so high as to cause the magnitude of the voltage across transformer terminals PTx/PTy to become high enough to cause current to flow through the Zener diodes, thereby disabling the inverter and stopping the flow of charging current.

In the preferred embodiment, the clamping voltage of the Zener diodes is so chosen that Zener current will start to flow at the point where the magnitude of the voltage across the battery-being-charged has reached the level corresponding to full charge. Thus, when the battery reaches full charge, the inverter is automatically disabled. However, every 30 seconds or so, inverter operation is automatically re-initiated, and charging will also be re-initiated if at any time the magnitude of the voltage on the battery has fallen below full-charge level.

Of course, for the special storage battery schematically illustrated by FIG. 2, the magnitude of the clamping voltage of the Zener diodes was chosen so as to correspond to full-charge voltage of the built-in SMFB battery.

The magnitude of the current provided from terminals B−/B+ for charging of the SMFB battery is proportional to the magnitude of the DC voltage between the BW−/BW+ bus wires. Thus, with 120 Volt/60 Hz power input to the PIT1/PIT2 terminals, charging current is about 60% higher than with 12 Volt/DC input.

The operation of the arrangement illustrated in FIG. 4 may be explained as follows.

The integral battery charging and control means (IBCCM) constitutes a complete integral entity adapted to be electrically connected with and mechanically fastened to a more-or-less ordinary automotive-type storage battery—as well as to be electrically disconnected and mechanically unfastened therefrom.

The mechanical fastening between the IBCCM entity and automotive-type storage battery ASB is accomplished in a simple snap-in manner by way connect means DMCM1/DMCM2 and MCL1/MCL2. It is noted, however, that other fastening means may safely and economically be used.

When the IBCCM entity is fastened to the ASB entity, thereby in effect to form a special storage battery with built-in charging and output control means, the resulting combination may be carried by carrying handle CH. Thus, the IBCCM entity serves the additional function of constituting a means for more easily carrying the ASB battery.

Additional Comments a) The nominal voltage of the SMFB battery of FIG. 2 is preferably at least 14 Volt; which permits effective and complete charging of a 12 Volt battery connected with the POT1/POT2 terminals. However, it would indeed be feasible to have the SMFB battery be a battery of 12 Volt nominal voltage; in which case it would be useful—in one of several different operating modes— to have an electronic voltage boosting means connected in circuit between the SMFB battery and the POT1/POT2 terminals, thereby providing for a voltage of adequate magnitude to permit complete charging of a 12 Volt battery.

b) In the preferred embodiment, the charging capacity of battery charger BC is about 6 Ampere when the PIT1/PIT2 terminals are connected with an ordinary power line and about 3.75 Ampere when they are connected with a 12 Volt/DC source.

c) In the preferred embodiment, the charge capacity of the SMFB battery is about 80 Ampere-hours—which is adequate to provide complete charging of most any ordinary automotive-type storage battery—and the output current capacity is about 600 Ampere at a terminal voltage of about 7.5 Volt, which is adequate for cranking an ordinary automotive engine under very severe conditions.

d) In an alternative version, the IBCCM entity of FIG. 4 would be so made as to snap-fasten directly onto the top of a storage battery, thereby automatically to accomplish both the requisite electrical and mechanical connections.

e) It is not necessary that the ASB battery of FIG. 4 be a totally sealed battery, nor is it an absolute necessity that the SMFB battery of FIG. 2 be totally sealed.

f) Special storage battery SSB of FIG. 2 may be provided without the built-in battery charger; in which case an external battery charger means would have to be used. However, it would still be important that the battery's charging input terminals be different from the battery's power output terminals.

g) The value of Rc of FIG. 2 is so chosen as to provide automatic protection against excessively deep discharge of the SMFB battery. By making Rc a variable resistor, it would be possible to adjust the voltage level at which the power relay would drop out in the mode where the SSB battery is used for powering a resistive or motor load.

h) Alarm means AM of FIG. 2 is used to provide an audible warning at a point where the SSB battery needs to be charged; which point would be detected by way of the magnitude of the voltage provided across the terminals of AM. The purpose of this alarm means is that of providing a warning in situations where the SMFB battery is not fully charged, yet is not connected with a source of charging power. Thus, an alarm signal would remind the owner of the SSB battery to connect it with the 120 Volt power line or with a 12 Volt DC source.

i) The rationale for providing means whereby the SSB battery can be charged from a 12 Volt/DC source (as well as from a 120 Volt/60 Hz source) is that of permitting the SSB battery to be kept in the trunk in a car on a long term basis, and to be kept up to full charge by being connected with the car's 12 Volt electrical system. That way, there would always be a fully charged spare battery readily available for an emergency situation.

j) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A storage battery product comprising:

a storage battery having a pair of battery electrodes;

a pair of output terminals;

first means connected between the battery electrodes and the output terminals and operative controllably and alternatively to permit and to prevent extraction of charge from the storage battery by way of the output terminals;

a pair of input terminals;

second means connected in circuit between the input terminals and the battery electrodes, this second means being operative to permit the charging of the storage battery from the input electrodes but to prevent the extraction of charge therefrom; and housing means operative to hold together the storage battery, the output terminals, the first means, the input terminals, and the second means, thereby to render the storage battery product a mechanically integral and substantially rigid entity.

2. The battery product of claim 1 wherein the first means is operative effectively to provide for direct electrical connection between the battery electrodes and the output terminals, this direct electrical connection providing substantially no resistance to the flow of current.

3. The battery product of claim 1 wherein the first means comprises over-current protection means operative to prevent current flowing between the output terminals from exceeding a predetermined magnitude for longer than a certain period of time.

4. The battery product of claim 1 wherein the first means comprises switch means operative controllably to make and break electrical connection between the battery electrodes and the output terminals.

5. The battery product of claim 4 wherein the switch means is electrically actuatable.

6. The battery product of claim 5 wherein the switch means is actuated only when the magnitude of any voltage between the battery electrodes exceeds a predetermined level.

7. The battery product of claim 1: i) being further characterized by having three mutually perpendicular dimensions, namely width, depth, and height, and ii) wherein at least one of these dimensions is identical to the corresponding dimension of the storage battery.

8. The battery product of claim 1 wherein: i) the battery product itself has a first outer surface effectively consisting of six mutually perpendicular product surfaces, ii) the storage battery has a second outer surface effectively consisting of six mutually perpendicular battery surfaces, and iii) at least one of the six mutually perpendicular product surfaces is identical with one of the six mutually perpendicular battery surfaces.

9. The battery product of claim 1 wherein: i) the second means comprises a battery charger operative to be powered from the voltage on an ordinary electric utility power line, and ii) the input terminals comprises male receptacle means operative to receive and hold plug means attached to cord means connectable with an ordinary household electric receptacle.

10. A special storage battery product comprising:

a storage battery having a pair of battery electrodes;

a pair of output terminals;

electrically actuatable control means connected between the battery electrodes and the output terminals and operative in response to electrical actuation signals to make and break electrical connection between the battery electrodes and the output terminals; and casing means operative to encase and hold together the storage battery, the output terminals, and the control means, thereby to provide the special storage battery product as a mechanically integral entity.

11. The produce of claim 10 comprising means to sense the magnitude of the voltage present between the battery electrodes and to provide the electrical actuation signals in response to different levels of this voltage.

12. The product of claim 10 wherein the control means is operative to make electrical connection between the battery terminals and the output terminals only in the event that the magnitude of any DC voltage present between the output terminals exceeds a predetermined level.

13. The product of claim 10 additionally comprising a pair of input terminals connected with the battery electrodes by way of electric circuit means operative to permit flow of electric power from the input terminals to the battery while prohibiting the flow of electric power from the battery to the input terminals.

14. The product of claim 13 wherein the electric circuit means is operative to cause proper battery charging when an AC voltage is provided to the input terminals.

15. The product of claim 13 wherein the electric circuit means is operative to cause proper battery charging when the input terminals are connected with an ordinary electric utility power line.

16. A storage battery product comprising:

a storage battery having a pair of battery terminals and an outer surface effectively consisting of six mutually perpendicular battery surfaces;

a pair of input terminals;

circuit means connected between the input terminals and the battery terminals and operative to permit electric power to flow from the input terminals to the battery terminals but not from the battery terminals to the input terminals; and casing means operative to encase and hold together the storage battery, the input terminals, and the circuit means;

thereby to form a mechanically integral storage battery product having an outer surface effectively consisting of six mutually perpendicular product surfaces, at least one of the product surfaces being common with one of the battery surfaces.

17. The product of claim 16 wherein the circuit means comprises isolation means operative to provide electrical isolation between the input terminals and the battery terminals.

18. The product of claim 16 wherein the circuit means comprises battery charger means operable to be powered from the voltage on an ordinary electric power line and, when so powered, to charge the storage battery.

19. The product of claim 16 and carrying handle means operative to permit the special battery product to be carried by one hand.

20. The produce of claim 16 wherein the circuit means is operative to cause charging of the storage battery as long as a voltage of magnitude in excess of a predetermined level is applied to the input terminals.

21. The product of claim 16 wherein the circuit means is operative to cause charging of the storage battery even if the peak magnitude of the voltage applied between the input terminals is lower than the voltage present between the battery terminals while the battery is being charged.

22. The product of claim 21 wherein the voltage applied between the input terminals is a DC voltage.

23. The product of claim 16 wherein the circuit means is operative to cause charging of the storage battery whether the voltage applied across the input terminals is a DC voltage of magnitude on the order of 12 Volt or an AC voltage of magnitude on the order of 120 Volt.

24. A special storage battery having a pair of output terminals and being operative to charge another storage battery connected therewith, comprising:

voltage sensing means sensing operative to provide a control signal in response to the magnitude of any voltage present between the output terminals; and control means responsive to this control signal and operative to terminate the flow of any current flowing from the output terminals whenever the magnitude of the voltage between the output terminals is above a first predetermined level.

25. The special storage battery of claim 24 wherein the control means is additionally operative to prevent current from flowing from the output terminals in case the magnitude of any voltage present thereacross is below a second predetermined level.

26. The special storage battery of claim 24 and means operative to permit manual adjustment of the first predetermined level.

27. The special storage battery of claim 24 and a pair of input terminals separate from the output terminals and operative to receive electric power for charging the special storage battery.

28. The combination of:

a) a storage battery having a pair of battery terminals; and b) a charging and control means operative to be fastened onto the storage battery, thereby to form a mechanically integral entity, the charging and control means having:

a pair of power terminals operable to connect with the battery terminals;

a pair of output terminals connected with the power terminals by way of electric control means and, when so connected, operative controllably to provide power to a load connected with the output terminals; and a pair of input terminals connected with the power terminals by way of electric circuit means and operative, when so connected, to connect with a source of electric power and to cause the storage battery to be charged therefrom.

29. The combination of claim 28 wherein the charging and control means is operative, after having been fastened onto the storage battery, to be detached therefrom.

30. The combination of claim 28 wherein the storage battery is of a sealed maintenance-free type and wherein the charging and control means, once having been fastened onto the storage battery, can not readily be detached therefrom, thereby rendering the combination an integral entity suitable for being thrown away in its entirety at the end of its useful life.

* * * * *